No. 720,538. PATENTED FEB. 10, 1903.
J. B. WALLACE.
JOINT FOR SHEET METAL PIPES.
APPLICATION FILED APR. 16, 1902.
NO MODEL.
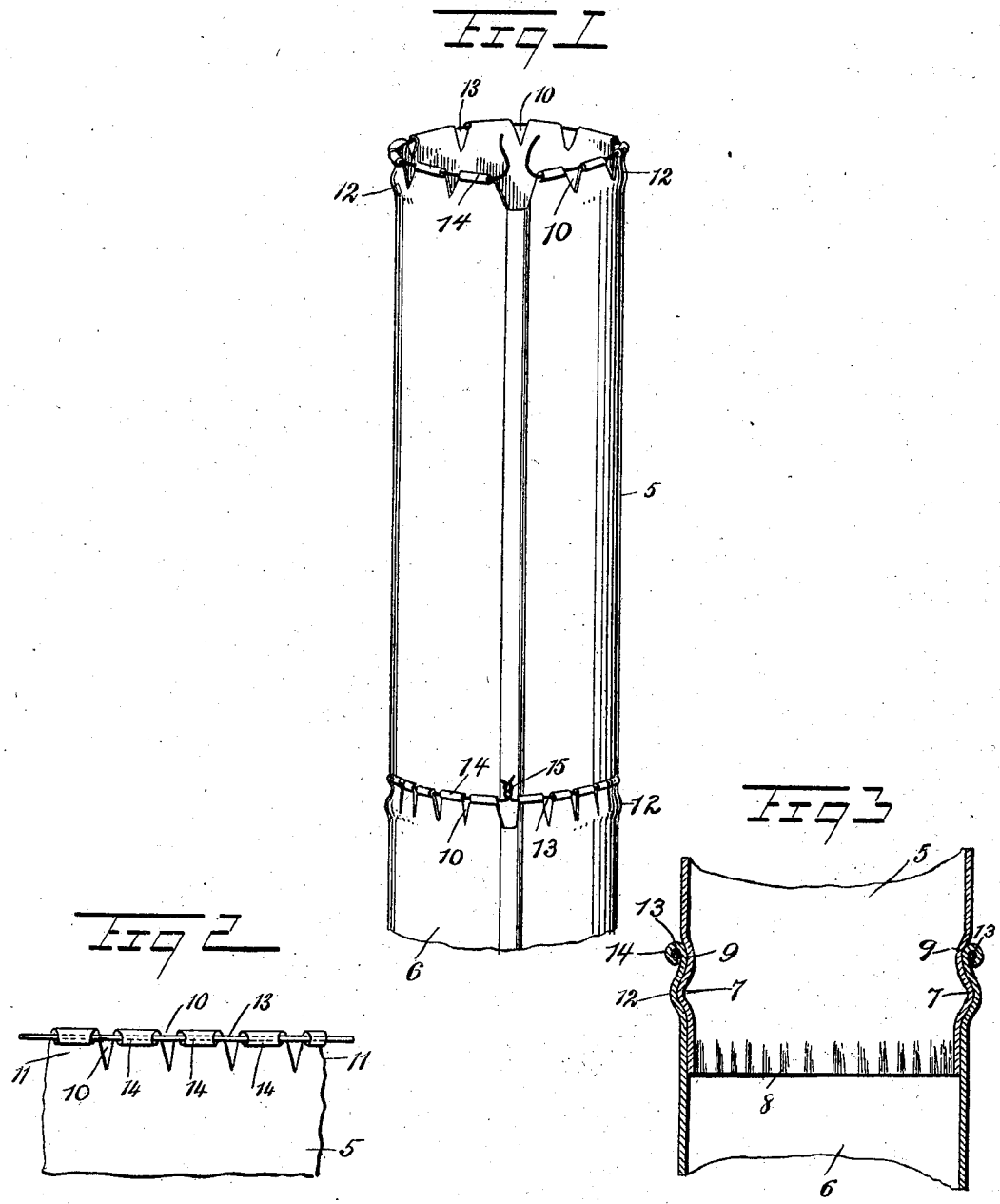
WITNESSES:
H. Walker
H. J. Bernhard
INVENTOR
James B. Wallace
BY
ATTORNEYS.

UNITED STATES PATENT OFFICE.

JAMES B. WALLACE, OF CAMDEN, SOUTH CAROLINA.

JOINT FOR SHEET-METAL PIPES.

SPECIFICATION forming part of Letters Patent No. 720,538, dated February 10, 1903.

Application filed April 16, 1902. Serial No. 103,165. (No model.)

*To all whom it may concern:*

Be it known that I, JAMES B. WALLACE, a citizen of the United States, and a resident of Camden, in the county of Kershaw and State of South Carolina, have invented new and useful Improvements in Joints for Sheet-Metal Pipes, of which the following is a full, clear, and exact description.

My invention relates to improvements in joints for pipes of the sheet-metal variety, such as are used for stovepipes, rain-water conductors, and the like.

The object that I have in view is the provision of an improved construction by which meeting lengths or sections of pipe may be easily assembled into overlapping relation and secured or locked in firm immovable relation, thus preventing the pipe-sections from pulling or dropping apart at the joint. The improved construction allows the sheet-metal pipe in a flat condition to be laid one on top of the other or packed closely together, so as to take up a minimum amount of room in storage or transportation. The connection or union of the lengths and the uncoupling thereof can be made without special tools and by unskilled labor, and the pipe can be manufactured rapidly and economically, so as to place it on the market without any substantial increase in the price to the consumer.

Further objects and advantages of the invention will appear in the course of the subjoined description, and the actual scope of the invention will be defined by the claims.

Reference is to be had to the accompanying drawings, forming a part of this specification, in which similar characters of reference indicate corresponding parts in all the figures.

Figure 1 is a perspective view of two lengths of sheet-metal pipe united by a joint embodying my invention. Fig. 2 is a fragmental view in elevation, illustrating the flat or sheet-like form of a part of one of the lengths or sections of the pipe; and Fig. 3 is a vertical sectional view, on an enlarged scale, through a pipe having its lengths or sections united by the improved joint.

5 6 designate two lengths or sections of pipe constructed in accordance with my invention and adapted to be united or coupled together by the joint which is formed by the coöperating ends of said lengths or sections. Each length is constructed at one end for insertion into the adjacent section of pipe, while its other end is peculiarly formed for expansion or contraction and adapted to have overlapping relation to the insertible end of an adjacent pipe-section. In Fig. 3 the insertible end of the pipe-section 5 is similar to the ordinary well-known style of stovepipe lengths in that said insertible end is formed with an annular bead 7 on a line some distance within the extremity of the pipe length, and, furthermore, the extreme end of the pipe length is crimped or corrugated, as indicated at 8, in order to reduce the diameter of the pipe at the extremity of its insertible end, and thereby enable lengths or sections of pipe to be more expeditiously coupled together. The insertible end of the pipe-section may also be provided with a depression, groove, or channel 9, and thus the bead is situated between the crimped end 8 and the annular grooved portion 9.

One of the most important features of my invention resides in the construction of the opposite overlapping end portion of the section or length of pipe. This end of the pipe is formed with an annular series of V-shaped incisions or cuts 10, which extend inwardly for a suitable distance from the edge of said overlapping end portion, said incisions or cuts 10 being of uniform length and disposed equidistantly. These V-shaped incisions divide or form the end portion of the pipe length into a series of pliable tongues 11, which are integral with the pipe and are adapted to be expanded or contracted in order to snugly fit the inserted end of an adjacent pipe-section. The length of the incisions and the corresponding length of the tongues formed thereby is not a matter of much consequence; but in the preferred embodiment of the invention the overlapping end of the pipe-section is formed with an annular bead 12, and the incisions 10 extend to or into this bead 12.

The means for contracting the tongues around the end of an adjacent pipe-section is obtained by the employment of an annular band or ring 13, which may advantageously be made from a single piece of wire. This band or ring should be connected with the pliable tongues in a manner to confine the band or ring from displacement relative to said tongues, and this is attained in one form of the invention by bending or coiling the narrow free ends of the tongues upon themselves so as to produce the eyes 14, through which is threaded the wire ring 13, as clearly shown by the drawings. Any suitable means may be adopted for uniting the free ends of the wire ring, which is shown at the top of Fig. 1 as having its ends free or disconnected; but a convenient method of joining the ends of the wire consists in twisting them together, so as to contract the diameter of the ring, and to draw the pliable tongues firmly into engagement with the inserted end of the pipe. The twisting of the ends of the wire ring or band is indicated at 15 in Fig. 1; but I would have it distinctly understood that any coupling may be employed which will allow the diameter of the ring to be reduced, and thereby effect the compression of the pliable tongues into interlocking engagement with the inserted pipe lengths.

The improved length or section of the pipe may be advantageously manufactured from sheet metal by any suitable machinery or by hand, as desired, and flat sheets of fabricated metal may be packed together or laid one on top of the other when they are spread out in the form of sheets, as shown by Fig. 2, thus making provision for the storage and transportation of the metallic sheets to the best advantage. If desired, however, the sheets of prepared metal may be folded upon themselves into cylindrical form, so as to produce the desired pipe lengths or sections, as shown by Figs. 1 and 3; but the ends of the wire bands or rings 13 should be unconfined, as represented at the top of Fig. 1. The insertible end of one pipe length, as 5 in Fig. 3, may be pressed into the tongue-formed overlapping end of an adjacent pipe length, such as 6. This will bring the bead 7 of the length 5 into interlocking engagement with the bead 12 of the length 6, and thereafter the band or ring 13 can be reduced in diameter by twisting its ends together, as at 15, or otherwise, thus compressing the pliable tongues 11 into the groove 9 of the pipe 5, whereby an exceedingly strong and secure union is obtained between the two lengths of pipe. It is evident that the sections 5 6 cannot be easily pulled apart, because they are interlocked together and bound firmly by the frictional engagement of the beads, the groove, and the tongues, and this engagement is maintained in an intact condition and by positive means owing to the compression of the tongues by the band or ring.

It is evident that the wire can be cut or loosened, thus releasing the tongues and allowing them to be expanded sufficiently to permit of the disengagement of the connected ends of the pipe-sections; but the improved joint effectually prevents any tendency of accidental separation of the members.

Having thus described my invention, I claim as new and desire to secure by Letters Patent—

1. The combination of meeting pipe-sections, the insertible end of one section having an annular groove and an annular bead situated between the end of said pipe-section and said groove, and the overlapping end of the other pipe-section provided with pliable tongues, and means for compressing the tongues of one pipe-section into intimate frictional engagement with the beaded and grooved part of the other pipe-section.

2. A stovepipe-length provided with a series of integral pliable tongues each folded upon itself into an eye, and a fastening threaded through the eyes and secured thereby on the tongues in position for immediate use, said fastening arranged to compress the tongues by being drawn tightly against the same, as set forth.

3. As a new article of manufacture, a pipe length or section provided near its insertible end with an outwardly-projecting bead and having its other overlapping end divided into a series of integral pliable tongues, and a fastening attached loosely to the tongues of the series and arranged to compress the latter tightly around the beaded end of a meeting pipe length or section.

In testimony whereof I have signed my name to this specification in the presence of two subscribing witnesses.

JAMES B. WALLACE.

Witnesses:
F. L. ZEMP,
C. H. YATES.